(12) United States Patent
Wang

(10) Patent No.: US 10,164,527 B2
(45) Date of Patent: Dec. 25, 2018

(54) CLOSED-LOOP BOOST DRIVERS WITH RESPONSIVE SWITCHING CONTROL

(71) Applicant: NXP B.V., Eindhoven (NL)

(72) Inventor: Ge Wang, Chandler, AZ (US)

(73) Assignee: NXP B.V., Eindhoven (NL)

( * ) Notice: Subject to any disclaimer, the term of this patent is extended or adjusted under 35 U.S.C. 154(b) by 673 days.

(21) Appl. No.: 14/106,043

(22) Filed: Dec. 13, 2013

(65) Prior Publication Data

US 2015/0171747 A1 Jun. 18, 2015

(51) Int. Cl.
*H02M 3/156* (2006.01)
*H02M 3/158* (2006.01)
*H05B 33/08* (2006.01)

(52) U.S. Cl.
CPC ........... *H02M 3/158* (2013.01); *H02M 3/156* (2013.01); *H05B 33/0815* (2013.01); *Y02B 20/347* (2013.01)

(58) Field of Classification Search
CPC .................................................... H02M 3/158
See application file for complete search history.

(56) References Cited

U.S. PATENT DOCUMENTS

| | | | |
|---|---|---|---|
| 6,177,782 B1 | 1/2001 | L'Hermite et al. | |
| 6,586,890 B2 | 7/2003 | Min et al. | |
| 6,760,238 B2 | 7/2004 | Charych | |
| 7,071,630 B1 | 7/2006 | York | |
| 8,471,490 B2 | 6/2013 | Jessenig et al. | |
| 2003/0142841 A1* | 7/2003 | Wiegand | G10K 11/1788 381/172 |
| 2009/0085535 A1* | 4/2009 | Wei | H02M 3/156 323/272 |
| 2011/0043133 A1* | 2/2011 | Van Laanen | H02M 1/4225 315/294 |
| 2011/0215737 A1* | 9/2011 | Poirier | H02M 3/156 315/297 |
| 2013/0313989 A1* | 11/2013 | Chen | H05B 33/0887 315/200 R |
| 2015/0008837 A1 | 1/2015 | Tenfel | |
| 2015/0091544 A1* | 4/2015 | Jayaraj | H02M 3/156 323/284 |

FOREIGN PATENT DOCUMENTS

| | | |
|---|---|---|
| DE | 10 2006 024422 A1 | 11/2007 |
| DE | 10 2012 100352 B3 | 7/2013 |
| EP | 2 144 482 A1 | 1/2010 |

OTHER PUBLICATIONS

Extended European Search Report for EP Patent Appln. No. 14192764.0 (dated Apr. 16, 2015).

* cited by examiner

*Primary Examiner* — Jimmy Vu
*Assistant Examiner* — Laura Yesildag

(57) ABSTRACT

Various aspects of the present disclosure are directed toward apparatuses, methods, and systems for presenting boosted power regulation to a load. These aspects include a power-switching circuit that selectively passes current in response to a boost-converter control circuit. A current-control circuit selectively powers the load in response to the power-switching circuit passing current.

10 Claims, 4 Drawing Sheets

CLOSED-LOOP BOOST DRIVERS WITH RESPONSIVE SWITCHING CONTROL

Aspects of various embodiments of the present invention are directed to apparatuses, methods, and systems for presenting boosted power regulation to a load.

Power for portable electronic devices such as smartphones, tablets and other portable devices (e.g., GPS navigation devices) can come from low-voltage power supplies such as batteries or solar panels. Achieving higher voltages to supply to the portable electronic devices is often difficult due to small device size and a lack of space.

Boost regulators can provide an increased voltage/current to the electronic devices while maintaining small device size. These and other matters have presented challenges to different types of power boosting to portable electronic devices, for a variety of applications.

Various example embodiments are directed to apparatuses, methods, and systems that are directed toward boosted power regulation as may be used as an integrated flash driver, and resolving the above-discussed issues and others.

Various aspects of the present disclosure are directed toward apparatuses for presenting boosted power regulation to a load (e.g., LEDs). The apparatuses include a boost-converter control circuit including a pulse-width modulation (PWM) switching regulator operating based on a PWM clock signal. Further, the apparatuses include a power-switching circuit that selectively passes current, in response to the boost-converter control circuit. Current is passed by the power-switching circuit from a DC power supply. The direct-current supply is connected at a supply-side of the power-switching circuit, and current is passed to the load connected at a load-side of the power-switching circuit. Additionally, the apparatuses include a current-control circuit including two terminals. One of the terminals connected to the load-side of the power-switching circuit, and the other terminal selectively powers the load in response to the power-switching circuit passing current under control of and in response to the boost-converter control circuit.

The boost-converter control circuit processes (or samples) voltage levels, corresponding to the respective voltages at the one terminal and at the other terminal, by switching the voltage levels. The voltage levels are respectively switched using an inverted phase of the PWM clock signal and a non-inverted phase of the PWM clock signal, and in response to the switching, provide selective control to the power-switching circuit.

Aspects of the present disclosure are also directed toward apparatuses that include first and second power switches, a current-control circuit, and a boost-converter control circuit. The first power switch selectively passes current from a direct-current power supply at a supply-side of the first power switch to a load at a load-side of the first power switch. The first power switches selectively passes current in response to a first control signal presented to the first control port. The second power switch selectively diverts or sinks current from the supply-side of the first power switch in response to a second control signal presented to a second control port.

The current-control circuit includes two terminals, one of which is connected to the load-side of the first power switch. The boost-converter control circuit includes a PWM switching regulator operating based on a PWM clock signal. Additionally, the boost-converter control circuit processes/samples voltage levels corresponding to the respective voltages at the terminals of the current-control circuit by respectively switching the voltage levels using an inverted phase of the PWM clock signal and a non-inverted phase of the PWM clock signal. In response to the switching, boost-converter control circuit provides the first control signal and the second control signal.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
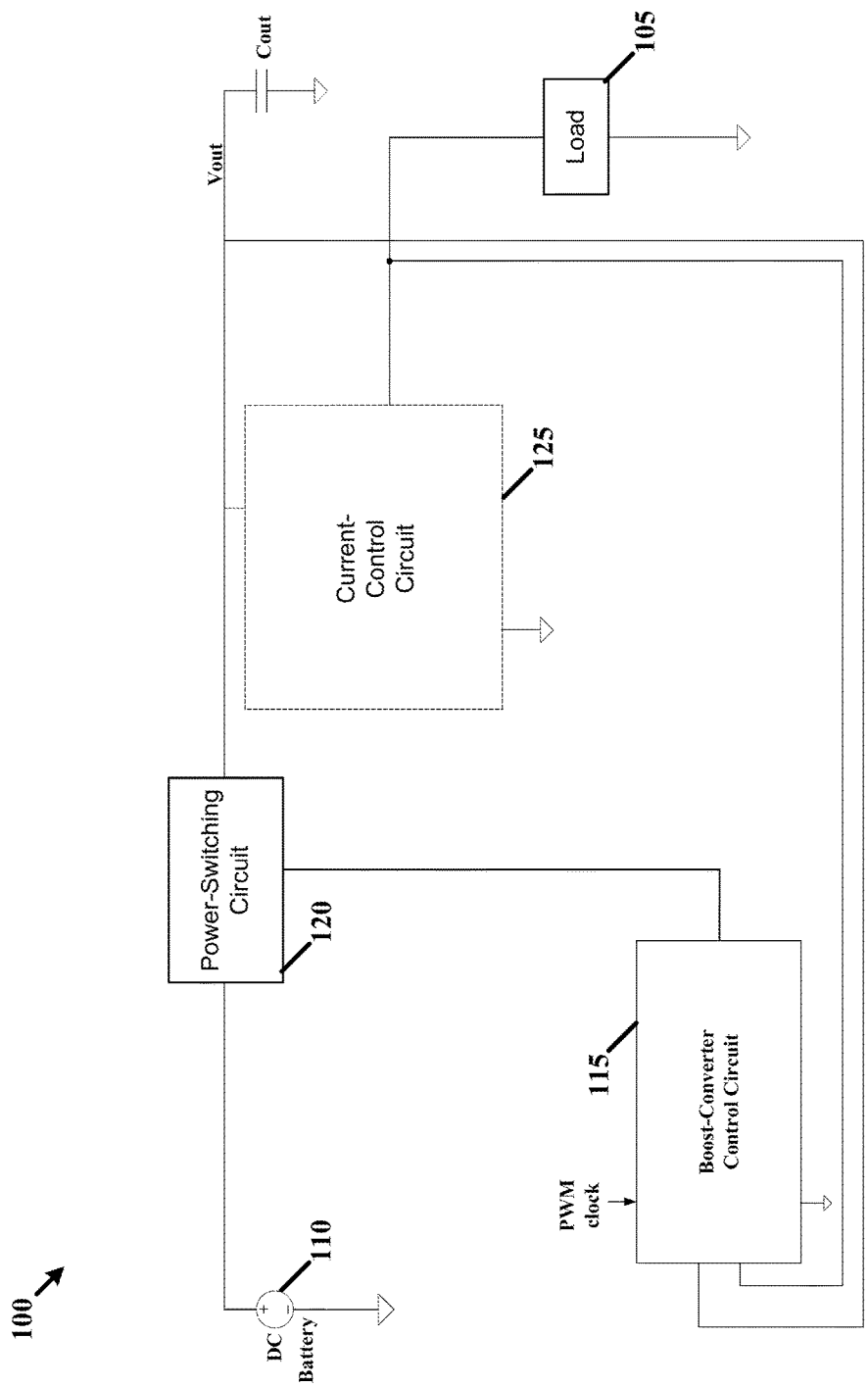
FIG. 1 shows an example circuit-based diagram of an apparatus for presenting boosted power regulation to a load, consistent with various aspects of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including aspects defined in the claims. In addition, the term "example" as used throughout this application is only by way of illustration, and not limitation.

Aspects of the present invention are believed to be applicable to a variety of different types of devices, systems and arrangements directed toward boosted power regulation. Handheld devices, having light emitting diodes (LEDs), such as smart cell phones can require an output voltage range at a higher level than an input voltage range (e.g., 0 Volts to Vout (rail-to-rail)). For instance, an approximate input voltage range source can range between 2.5 Volts and 5 Volts, with an output current up to 1.5 Amp and higher output voltage that is sent to a flash (LED) device. The input power source is generally a Li-ion battery for a handheld device which has voltage typically in the range of 2.5 Volts to 4.2 Volts. Therefore, a boost regulator can be used as a driver for such a device.

Various aspects of the present disclosure are directed toward apparatuses for presenting boosted power regulation to a load such as one or more LEDs. The boost-converter control circuit including a PWM switching regulator operating based on a PWM clock signal. Further, the apparatuses include a power-switching circuit that selectively passes current, in response to the boost-converter control circuit. By way of the power-switching circuit, current is passed from a direct-current power supply, as connected at a supply-side of the power-switching circuit, to the load, as connected at a load-side of the power-switching circuit. Additionally, the apparatuses include a current-control circuit including two terminals, one of which is connected to the load-side of the power-switching circuit. The other terminal of the current-control circuit is connected to an output port of the boost-converter control circuit.

Moreover, the boost-converter control circuit processes (e.g., samples) voltage levels corresponding to the respective voltages at the one terminal and at the other terminal by switching the voltage levels. The voltage levels are respectively switched using an inverted phase of the PWM clock signal and a non-inverted phase of the PWM clock signal, and in response to the switching, provide selective control to the power-switching circuit.

In certain more specific embodiments, the terminal of the current-control circuit that is connected to the load-side of the power-switching circuit has an output voltage corresponding to the PWM clock signal. Additionally, the boost-converter control circuit processes the voltage levels (using the inverted phase and the non-inverted phase of the PWM clock signal) to sample a feedback signal from the current-control circuit at an equivalent rate of at least two times the frequency of the PWM clock signal. In other embodiments, the boost-converter control circuit includes a switchable capacitor bank that provides selective control to the power-switching circuit in response to the PWM switching regulator. Further, in certain more specific embodiments, the boost-converter control circuit includes a switchable capacitor bank that provides selective control to the power-switching circuit in response to the PWM switching regulator in accordance with the Nyquist sampling theorem.

Additionally, the apparatuses for presenting boosted power regulation can include load such as least one LED, and, in such embodiments, the current-control circuit controls an amount of current delivered to the LED from the direct-current power supply. Moreover, the power-switching circuit, in certain embodiments includes at least one PMOS-based switch that selectively passes current, in response to the boost-converter control circuit, from the direct-current power supply.

Aspects of the present disclosure are also directed toward apparatuses that include two power switches, a current-control circuit, and a boost-converter control circuit. The first of the two power switches selectively passes current from a direct-current power supply, at a supply-side of the switch, to a load at a load-side of the first power switch. This switch selectively passes current in response to a first control signal presented to the first control port. The second of two power switches selectively diverts or sinks current from the supply-side of the first power switch in response to a second control signal presented to a second control port.

The current-control circuit includes two terminals, one of which is connected to the load-side of the first power switch. The other terminal of the current-control circuit selectively powers the load in response to the first power switch passing current under control of and in response to the first control signal.

The boost-converter control circuit includes a PWM switching regulator operating based on a PWM clock signal. Additionally, the boost-converter control circuit processes/samples voltage levels corresponding to the respective voltages at the terminals of the current-control circuit by respectively switching the voltage levels using an inverted phase of the PWM clock signal and a non-inverted phase of the PWM clock signal. In response to the switching, boost-converter control circuit provides the first control signal and the second control signal.

In certain embodiments, the terminal of the current-control circuit that is connected to the load-side of the first power switch has an output voltage corresponding to the PWM clock signal. Additionally, in these such embodiments, the boost-converter control circuit processes the voltage levels using the inverted phase and the non-inverted phase of the PWM clock signal to sample a feedback signal from the current-control circuit in accordance with the Nyquist sampling theorem. Further, in other certain embodiments, the power switch of the current-control circuit is a PMOS-based switch having one terminal connected to the load-side of the first power switch. The other terminal of the current-control circuit is connected to an output port of the boost-converter control circuit. Further, the load to which current is supplied can include at least one LED, and the current-control circuit controls an amount of current delivered to the LED from the direct-current power supply.

In certain embodiments, the boost-converter control circuit includes a switchable capacitor bank configured and arranged to provide selective control to the power-switching circuit in response to the PWM switching regulator. Further, the boost-converter control circuit, in certain embodiments, includes a switchable capacitor bank configured and arranged to provide selective control to the power-switching circuit in response to the PWM switching regulator in accordance with the Nyquist sampling theorem.

Turning now to the figures, FIG. 1 shows an example circuit-based diagram of an apparatus 100 for presenting boosted power regulation to a load 105, consistent with various aspects of the present disclosure. As shown in FIG. 1, the apparatus 100 includes a direct-current (DC) power supply 110, and a boost-converter control circuit 115. The boost-converter control circuit 115 operates a switching regulator based on a PWM clock signal provided to the boost-converter control circuit 115. In response to the boost-converter control circuit 115, a power-switching circuit 120 selectively passes current from the DC power supply 110, connected at a supply-side of the power-switching circuit 120, to the load 105, connected at a load-side of the power-switching circuit 120. Current passes from the power-switching circuit 120 to the load 105 through a current-control circuit 125. The current-control circuit 125 includes a terminal connected to the load-side of the power-switching circuit 120, and a second terminal. The other terminal selectively powers the load 110. As noted above, this occurs in response to the power-switching circuit 120 passing current and under control of the boost-converter control circuit 115.

As a result of the selectively passing of current, the boost-converter control circuit 115 processes/samples voltage levels corresponding to the respective voltages at the one terminal and at the other terminal by switching the voltage levels. The voltage levels are respectively switched using an inverted phase of the PWM clock signal and a non-inverted phase of the PWM clock signal. Further, in response to the switching, the boost-converter control circuit 115 provides selective control to the power-switching circuit 120.

Figure 2:
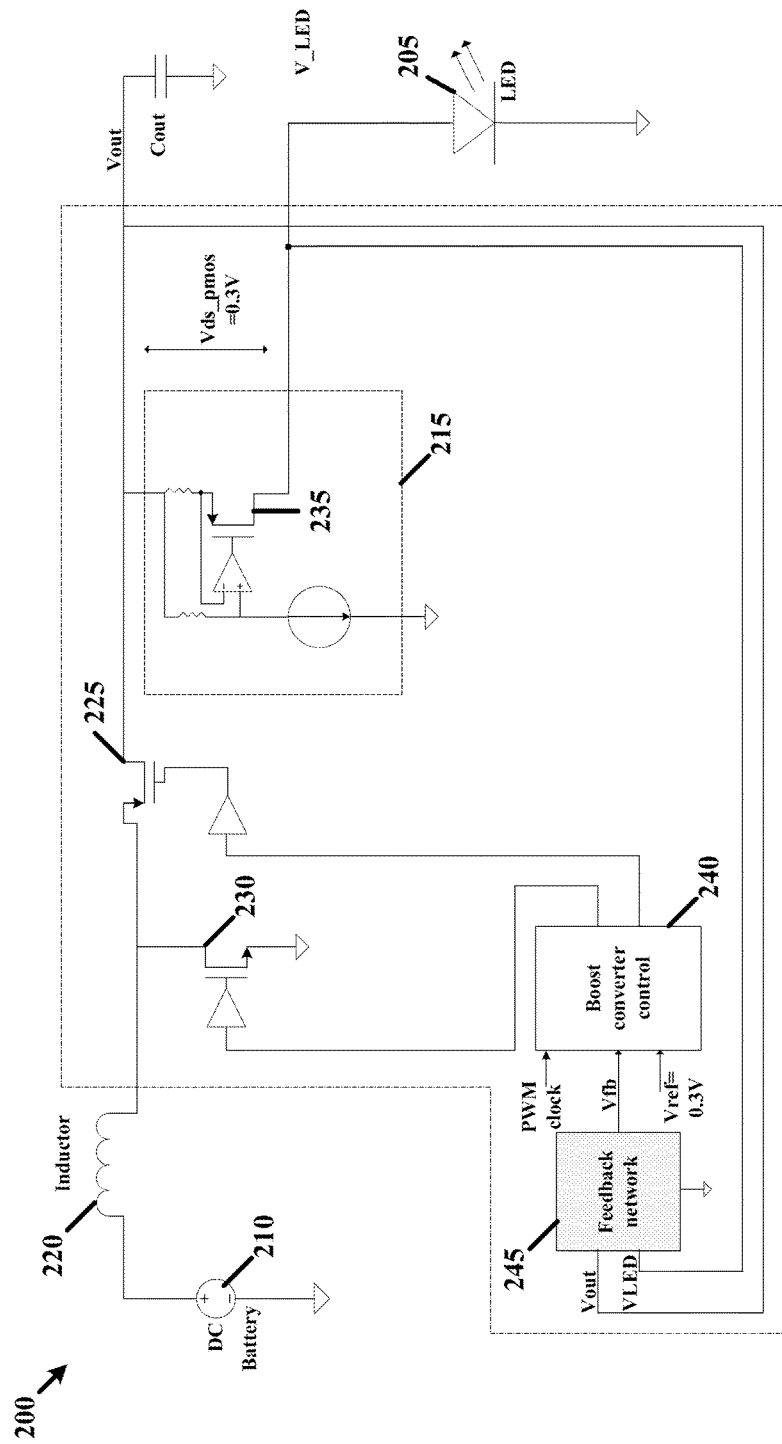
FIG. 2 shows another example circuit-based diagram of an apparatus for presenting boosted power regulation to a load such as an LED string, consistent with various aspects of the present disclosure.

FIG. 2 shows another example circuit-based diagram of an apparatus 200 for presenting boosted power regulation to a load 205 such as an LED string, consistent with various aspects of the present disclosure. FIG. 2 shows portions of the apparatus 200 that can be on-chip and off-chip. For instance, aspects that are inside the dotted line are on-chip, and aspects that are outside the dotted line are off-chip. The on-chip portions include a boost-regulator portion that is provided to boost up a battery 210 (or DC power supply) for the load 205, both of which can be off-chip. The battery 210 supplies the voltage necessary to supply a Vout for a current-control circuit 215 to drive the load 205 (an LED or a chain of LEDs). The current-control circuit 215 is PMOS based. During boost regulation, current-control circuit 215 is controlled in such a way that the source to drain voltage (Vds_pmos) of the current-control circuit 215 is regulated to be equal to Vref (e.g., Vref=0.3V). In the example shown, the boost regulation is an inductor 220 based.

More specifically, as shown in FIG. 2, a first power switch 220 passes current from the battery 210, via the inductor 220, to the load 205. Current is passed by the first power switch 225 in response to a first control signal presented to a first control port of the first power switch 225. As shown in FIG. 2, the battery 210 is on the supply side of the first power switch 225, and the load is on the supply-side of the first power switch 225. The apparatus 200 also includes a second power switch 230 to selectively divert or sink current from the supply-side of the first power switch 225 in response to a second control signal presented to a second control port. The first and second control signals are provided from a boost converter control circuit 230, as discussed in further detail below.

The current-control circuit 215 includes a power switch 235 that selectively powers the load 205 in response to the first power switch 225 passing current under control of and in response to the first control signal. The power switch 235 of the current-control circuit 215 has one terminal connected to the load-side of the first power switch 225, with the second terminal selectively powering the load 205. The selective control, and feedback, is provided by a boost-converter control circuit 240 including a feedback network 245. The boost-converter control circuit 240 and the feedback network 245 operate based on a PWM switching regulator and a PWM clock signal. The boost-converter control circuit 240 and the feedback network 245 process voltage levels corresponding to the respective voltages at the terminals of the current-control circuit 215 by switching the voltage levels using an inverted phase of the PWM clock signal and a non-inverted phase of the PWM clock signal. In response to this switching, the boost-converter control circuit 240 provides the first control signal and the second control signal to the first power switch 225 and the second power switch 230.

In this manner, a relationship of Vds_pmos=Vout−V_LED exists. As shown in FIG. 2, this Vds_pmos voltage is fed back to the feedback network 245. Vref comes from a bandgap reference and is provided as a reference voltage. Since Vref refers to ground while Vds_pmos refers to V_LED voltage, they do not have a common ground. Thus, the current-control circuit 225 converts Vds_pmos to a ground-referenced voltage or converts Vref to a V_LED referred voltage in order for the loop regulation.

Figure 3:
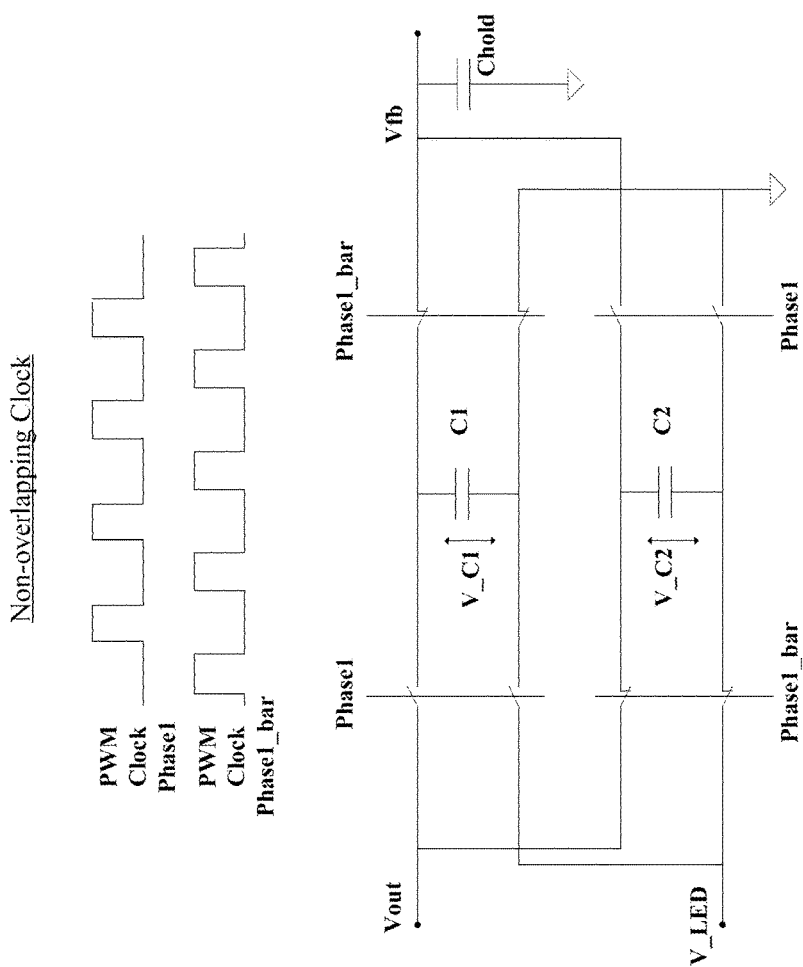
FIG. 3 shows an example circuit-based diagram of a boost-converter control circuit and/or feedback circuit, consistent with various aspects of the present disclosure.

FIG. 3 shows an example circuit-based diagram of boost-converter control circuit and/or feedback circuit, consistent with various aspects of the present disclosure. Sampling/processing by the boost-converter control circuit and/or feedback circuit, for example as shown and discussed above with reference to FIG. 1 and FIG. 2, the PWM signals are provided to a switch-cap circuit. Initially, the clock signal Phase1 is turned on (high), and Phase1_bar is off (low). The two ends of the sampling capacitor C1 are then connected to Vout and V_LED (as discussed above in FIG. 2). As a result, the capacitor voltage on C1 (noted as V_C1) is equal to Vds_pmos=Vout−V_LED. Then the next step, clock Phase1 is off and Phase_1 is on, C1 is then set to be connected in parallel with the holding capacitor Chold. Then the electronic charge on C1 is transferred to Chold. At the end, V_C1 is equal to Vfb on Chold during Phase1_bar being on. This charge transfer process repeats. Over time, the voltage Vfb on Chold will be infinitely close to V_C1. Eventually, Vds_pmos (=Vout−V_LED)=Vfb.

The example implementation shown in FIG. 3 operates under the Nyquist sampling theorem. The Nyquist sampling theorem states the sampling rate needs to be at least two times faster than the measured signal frequency in order to accurately measure the signal. Two sets of capacitors allow for a frequency effect without increasing the input signal frequency. Thus, in addition to using Phase1 sampling, it also utilizes the Phase1_bar as a sampling clock for an additional sampling circuit using C2. As a result, the equivalent sampling frequency is two times the PMW clock frequency.

Figure 4:
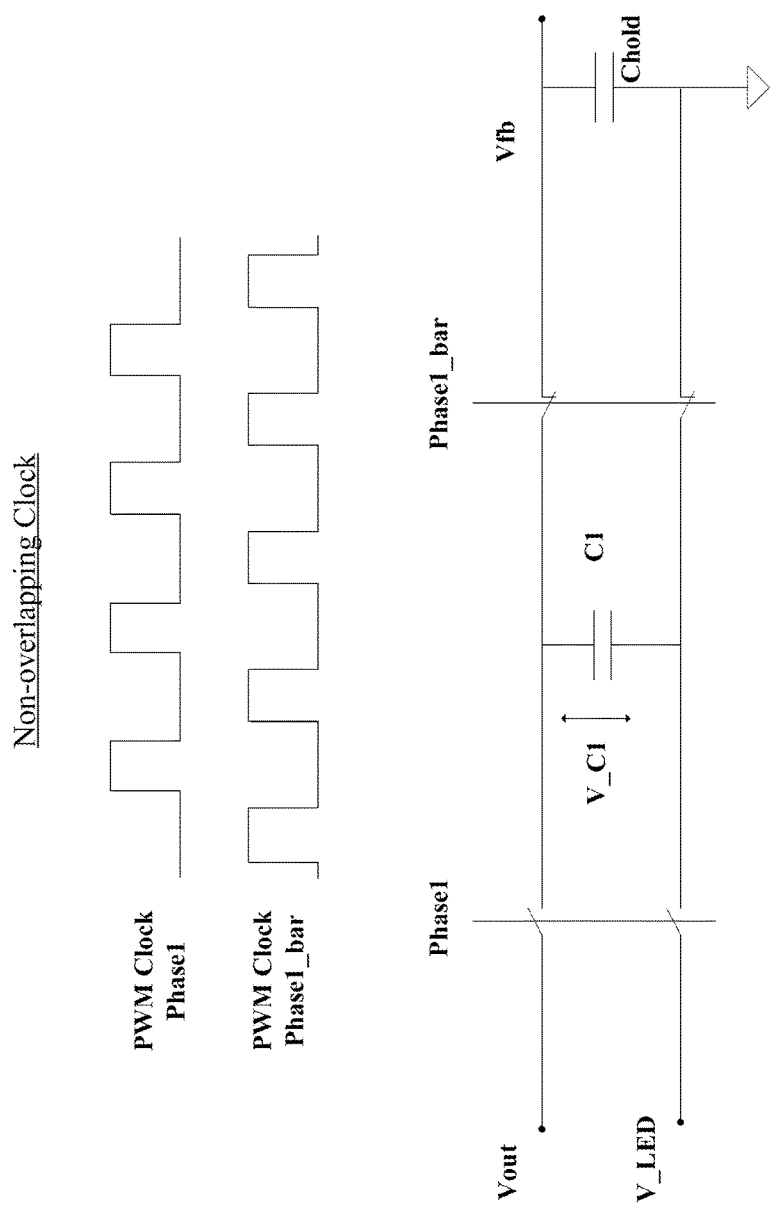
FIG. 4 shows another example circuit-based diagram of boost-converter control circuit and/or feedback circuit, consistent with various aspects of the present disclosure.

FIG. 4 shows an example circuit-based diagram of boost-converter control circuit or feedback circuit, consistent with various aspects of the present disclosure. Similar to the above example shown in FIG. 3, a 50% PWM clock signal is directly used to operate this circuit and is provided to the switch-cap bank, which is the existing clock for the boost regulator.

Various circuit-based building blocks and/or other modules may be implemented to carry out one or more of the operations and activities described herein and/or shown in the Figures. In such contexts, the illustrated/described "block" or "module" corresponds to circuitry that carries out one or more of these or related operations/activities. For example, in certain of the above-discussed embodiments, one or more blocks are discrete logic circuits or programmable logic circuits configured and arranged for implementing these operations/activities, as in the circuit modules shown in the Figures, such as the boost converter circuit block, power-switching circuit block, or current-control circuit block shown in FIG. 1. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made without strictly following the exemplary embodiments and applications illustrated and described herein. Furthermore, various features of the different embodiments may be implemented in different combinations. Such modifications do not depart from the true spirit and scope of the present disclosure, including those set forth in the following claims.

What is claimed is:

1. An apparatus for presenting boosted power regulation to a load, the apparatus comprising:
   a boost-converter control circuit including a pulse-width modulation (PWM) switching regulator configured for operating based on a PWM clock signal and the PWM switching regulator;
   a power-switching circuit configured and arranged to pass current, in response to a control signal generated by the boost-converter control circuit, from a direct-current power supply as connected at a supply-side of the power-switching circuit to the load as connected at a load-side of the power-switching circuit;
   a current-control circuit including a power switch, the power switch having a pair of terminals including a first terminal connected to the load-side of the power-switching circuit and a second terminal configured and arranged to selectively power the load through the first terminal, in response to the power-switching circuit passing current under control of and in response to the boost-converter control circuit;

wherein the boost-converter control circuit is configured and arranged to process output voltage levels corresponding to the respective voltages at the first terminal and at the second terminal of the power switch of the current-control circuit by switching the voltage levels respectively using an inverted phase of the PWM clock signal and a non-inverted phase of the PWM clock signal to sample a feedback signal from the current-control circuit, and in response thereto, providing selective control to the power-switching circuit, and wherein the first terminal of the power switch of the current-control circuit has an output voltage corresponding to the PWM clock signal, and wherein the boost-converter control circuit is further configured and arranged to process the voltage levels using the inverted phase and the non-inverted phase of the PWM clock signal to sample the feedback signal from the current-control circuit at an equivalent rate of at least two times a frequency of the PWM clock signal, wherein the feedback signal is based on a first voltage at the first terminal of the power switch and a second voltage at the second terminal of the power switch of the current-control circuit.

2. The apparatus of claim 1, wherein the boost-converter control circuit includes a switchable capacitor bank configured and arranged to provide selective control to the power-switching circuit in response to the PWM switching regulator, and wherein the power-switching circuit is configured and arranged to selectively pass current in response to the boost-converter control circuit.

3. The apparatus of claim 1, wherein the boost-converter control circuit includes a switchable capacitor bank configured and arranged to provide selective control to the power-switching circuit in response to the PWM switching regulator in accordance with the Nyquist sampling theorem.

4. The apparatus of claim 1, wherein the load includes at least one light emitting diode (LED), and the current-control circuit is configured and arranged to control an amount of current delivered to the LED from the direct-current power supply.

5. The apparatus of claim 1, wherein the power-switching circuit includes at least one PMOS-based switch configured and arranged to selectively pass current, in response to the boost-converter control circuit, from the direct-current power supply.

6. The apparatus of claim 1, wherein the power-switching circuit includes:
  a first power switch, having a first control port, configured and arranged to pass current from a direct-current power supply at a supply-side of the first power switch to a load at a load-side of the first power switch, in response to a first control signal presented to the first control port; and
  a second power switch, having a second control port, configured and arranged to sink current, in response to a second control signal presented to the second control port, from the supply-side of the first power switch.

7. The apparatus of claim 6, wherein the power switch of the current-control circuit includes a PMOS-based switch having one terminal connected to the load-side of the first power switch.

8. The apparatus of claim 6, further comprising a feedback network circuit configured and arranged to generate the feedback signal based on the first voltage at the first terminal of the power switch and the second voltage at the second terminal of the power switch.

9. The apparatus of claim 8, wherein
  the boost-converter control circuit is configured to generate a control signal based on the feedback signal, a reference voltage, and the PWM clock signal; and
  the power-switching circuit configured and arranged to pass current, in response to the control signal.

10. The apparatus of claim 1, wherein the boost-converter control circuit further includes an inductor configured and arranged with the direct-current power supply and connected at the supply-side of the power-switching circuit to pass the current to the power-switching circuit.

* * * * *